United States Patent
Jialanella et al.

(10) Patent No.: US 9,840,646 B2
(45) Date of Patent: Dec. 12, 2017

(54) EPOXY RESIN WITH ENHANCED VISCOSITY STABILITY AND USE THEREOF

(71) Applicant: Dow Global Technologies LLC, Midland, MI (US)

(72) Inventors: Gary L. Jialanella, Oxford, MI (US); Glenn G. Eagle, Bloomfield Hills, MI (US); Daniel Schneider, Waedenswil (CH); Andreas Lutz, Galganen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/918,660

(22) Filed: Oct. 21, 2015

(65) Prior Publication Data

US 2016/0040049 A1  Feb. 11, 2016

Related U.S. Application Data

(63) Continuation of application No. 14/234,665, filed as application No. PCT/US2012/046859 on Jul. 16, 2012, now abandoned.

(60) Provisional application No. 61/526,016, filed on Aug. 22, 2011.

(51) Int. Cl.

| | |
|---|---|
| *B29C 65/02* | (2006.01) |
| *B29C 65/48* | (2006.01) |
| *B32B 37/12* | (2006.01) |
| *C09J 163/00* | (2006.01) |
| *C08G 59/40* | (2006.01) |
| *C08G 18/48* | (2006.01) |
| *C08G 18/66* | (2006.01) |
| *C08G 18/72* | (2006.01) |
| *C08G 18/32* | (2006.01) |
| *C09J 11/08* | (2006.01) |

(52) U.S. Cl.
CPC .......... *C09J 163/00* (2013.01); *B29C 65/485* (2013.01); *B32B 37/1284* (2013.01); *C08G 18/3206* (2013.01); *C08G 18/3215* (2013.01); *C08G 18/4854* (2013.01); *C08G 18/6674* (2013.01); *C08G 18/722* (2013.01); *C08G 59/4021* (2013.01); *C09J 11/08* (2013.01); *B32B 2037/1253* (2013.01)

(58) Field of Classification Search
None
See application file for complete search history.

(56) References Cited

U.S. PATENT DOCUMENTS

| | | | |
|---|---|---|---|
| 4,659,779 A | 4/1987 | Bagga et al. | |
| 4,701,378 A | 10/1987 | Bagga et al. | |
| 4,713,432 A | 12/1987 | Bagga et al. | |
| 4,734,332 A | 3/1988 | Bagga et al. | |
| 5,073,601 A | 12/1991 | Mulhaupt et al. | |
| 5,202,390 A | 4/1993 | Mulhaupt et al. | |
| 5,278,257 A | 1/1994 | Mulhaupt et al. | |
| 6,944,091 B2 | 9/2005 | Lee et al. | |
| 7,557,168 B2 * | 7/2009 | Lutz | C08G 18/10 427/386 |
| 7,625,977 B2 * | 12/2009 | Lutz | C08G 18/12 156/330 |
| 2004/0181013 A1 | 9/2004 | Schenkel | |
| 2014/0171550 A1 * | 6/2014 | Jialanella | C08G 59/4021 523/400 |
| 2015/0001281 A1 * | 1/2015 | Jialanella | B32B 37/1284 228/175 |

FOREIGN PATENT DOCUMENTS

WO    2006/128722 A1    12/2006

* cited by examiner

*Primary Examiner* — Ana L Woodward

(57) ABSTRACT

The present invention provides low polyphenols (such as bisphenol A) tougheners for epoxy adhesives. The tougheners, and adhesives comprising the tougheners exhibit enhanced viscosity stability, e.g., compared to tougheners prepared from higher amounts of bisphenol A (and epoxy adhesives comprising them).

3 Claims, No Drawings

EPOXY RESIN WITH ENHANCED VISCOSITY STABILITY AND USE THEREOF

CROSS-REFERENCE TO RELATED APPLICATIONS

This application is a continuation of U.S. patent application Ser. No. 14/234,665, filed 24 Jan. 2014, now abandoned, which is a 35 USC §371 of PCT/US2012/046859, filed 16 Jul. 2012, which claims benefit of U.S. Provisional Application No. 61/526,016, filed 22 Aug. 2011.

BACKGROUND OF THE INVENTION

1. Field of the Invention

The present invention relates to tougheners for epoxy resin adhesives, to epoxy adhesives, as well as to their manufacture and use, and to articles comprising the tougheners and/or adhesives.

2. Discussion of Background Information

Epoxy-based adhesive compositions are reactive adhesive compositions comprising an epoxy resin, a curing agent and, usually, an accelerator. Upon heat-activation, epoxy groups of the epoxy resin react with the curing agent thereby linking the epoxy resin compounds by a polyaddition reaction to obtain a cured product. Such a cured product is known to have good mechanical properties and a chemical resistance superior to the cured product of other reactive adhesives. These characteristics make epoxy adhesive compositions particularly useful for demanding applications where stringent mechanical requirements must be satisfied, for example, in the automotive industry.

The cured product of an epoxy adhesive, other than a structural epoxy adhesive, generally has a relatively high static strength, for example, a high tensile and lap shear strength. Its dynamic strength however, e.g., its impact peel strength, is generally low. Adhesives used for the assembly of parts of a vehicle, such as automobiles, vans, lorries, trucks and trains, are called structural adhesives. The cured product of such a structural adhesive has to bear high static and dynamic loads. For that purpose, additional flexibilizers and/or tougheners are often added to the epoxy adhesive composition.

Structural epoxy adhesives have been described in several patent applications: EP-A-0 197 892 (and U.S. Pat. No. 4,659,779; U.S. Pat. No. 4,713,432: U.S. Pat. No. 4,734,332; U.S. Pat. No. 4,701,378 (all five of which are incorporated herein in their entireties by reference) describe a structural adhesive comprising an epoxy resin, a nitrogen comprising tougher and an accelerator. A problem described by these documents is to provide a structural adhesive having a good storage stability and a high curing rate. EP-A-0 308 664 (and U.S. Pat. No. 5,278,257 (both incorporated herein in their entireties by reference) describe an epoxy adhesive composition comprising a butadiene-acrylonitrile copolymer in combination with a polyphenol-terminated polyurethane or polyurea. EP-A-0 353 190; (U.S. Pat. No. 5,073,601; U.S. Pat. No. 5,202,390 (all three incorporated herein their entireties by reference) describe an epoxy adhesive composition comprising a butadiene-acrylonitrile copolymer in combination with a polyether-, polyester, polythioester or polyamide prepolymer terminated with a functionalized carbocyclic aromatic or araliphatic residue. Technology according to EP-A-0 308 664 and EP-A-0 353 190 is called Mulhaupt technology. The problem described by both EP-A-0 308 664 and EP-A-0 353 190 is to improve the impact peel strength of the cured product. At low temperatures, however, the impact peel strength is low. WO 00/20483 and (U.S. Published Patent Application No. 2004/0081013 (both incorporated herein in their entireties by reference) relate to a composition comprising an epoxide-reactive copolymer having a glass transition temperature of −30° C. or less, and a reaction product of a carboxylic acid anhydride with a di- or polyamine and a polyphenol or aminophenol. The cured product of WO 00/20483 has an impact peel strength of less than 20 N/mm at −40° C.

A problem with epoxy resins used as structural adhesive compositions is that the epoxy resins are somewhat brittle and subject to fracturing when impacted. This tendency to fracture can be reduced by the addition of toughening agents (or tougheners). The problem with the use of toughening agents is that such toughening agents tend to increase the viscosity of the composition and the increased viscosity limits the method and speed of application. Mulhaupt, U.S. Pat. No. 5,278,257 (discussed above) discloses an epoxy resin containing (a) copolymer based on at least one 1,3-diene and at least one polar, ethylenically unsaturated comonomer and (b) a phenol-terminated polyurethane, polyurea or polyurea urethane. The adhesives disclosed in Mulhaupt are excellent structural adhesives. These toughening agents are very viscous, and their viscosity tends to increase over time. This can limit their usefulness, e.g., by limiting their shelf-life, or limiting their utility in some high-volume applications which require high application speeds.

Some of the tougheners in the above documents can be generally described by the following idealized structure Formula I:

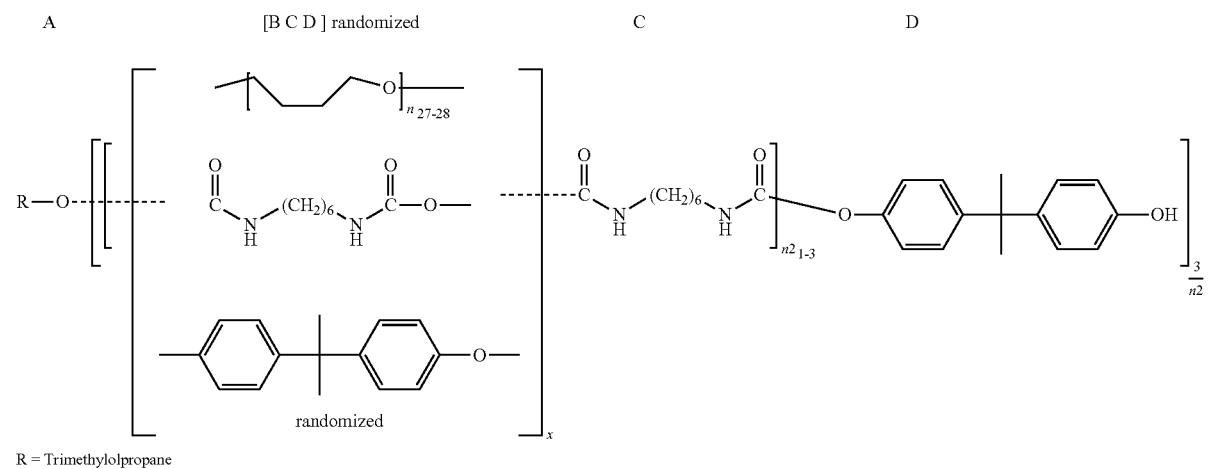

R = Trimethylolpropane

In Formula I, A is trimethylolpropane (branching unit); B is poly THF (telechelic polymers, hydroxy functional); C is hexamethylenediisocyanate (di-isocyanate); and D is bisphenol A (building block and capping compound).

There is a need for toughening agents that have greater viscosity stability and improved viscosity.

SUMMARY OF THE INVENTION

Tougheners are generally prepared with an excess of polyphenols in order to help drive the reaction to completion. Such polyphenols include bisphenol-A, bisphenol F, bisphenol M, and other similarly structured aromatic poly hydroxyl compounds.

Without being limited by any explanation, it is now believed that residual polyphenols in tougheners slowly react with epoxy groups in an epoxy resin, which results n chain extension and a gradual increase in viscosity. Thus, it has been surprisingly found that use of excess unreacted polyphenols, such as bisphenol A moieties, are important contributors to viscosity instability.

Accordingly, it has been surprisingly found that by controlling the amount of bisphenolic capping agent in an epoxy resin or toughener, it is possible to obtain a toughener with improved properties, including improved viscosity and shelf-life characteristics. The present invention includes the toughening agent, methods of manufacturing the toughening agent, methods of manufacturing epoxy and/or adhesive compositions comprising the toughener, adhesive epoxy compositions comprising the toughener, and articles comprising the adhesive compositions.

In general, the toughening agents comprise the reaction product of one or more isocyanate terminated pre-polymers and one or more capping compounds having one or more bisphenolic moieties, wherein the reaction product is terminated with the capping compounds.

In one embodiment, the invention provides a low polyphenols (bisphenol-A, bisphenol F, bisphenol M, and other similarly structured aromatic poly hydroxyl compounds) toughener comprising a reaction product of polytetrahydrofuran, one or more of the polyphenols, trimethylolpropane, a diisocyanate, and an organometallic catalyst, wherein the amount of polyphenols comprises less than about 20 wt %, based on weight of the toughener. While the invention concept can include many polyphenols, many of the embodiments disclosed herein use bisphenol A as an example of polyphenols.

In another embodiment, the invention also provides a process for manufacturing a low polyphenol toughener for an epoxy adhesive comprising: combining polytetrahydrofuran, bisphenol A, trimethylolpropane, a diisocyanate curing agent, and a catalyst, wherein the amount of bisphenol A is less than about 20 wt % of the total amount of the polytetrahydrofuran, the bisphenol A, the trimethylolpropane, the diisocyanate curing agent, and the catalyst.

In other embodiments of the present invention, the amount of bisphenol A is less than about 18 wt %, preferably below 15 wt %, based on weight of the toughener, e.g., based on the total amount of the polytetrahydrofuran, the bisphenol A, the trimethylolpropane, the diisocyanate curing agent, and the catalyst The invention also provides an epoxy adhesive comprising a low bisphenol A toughener according to the present invention, and methods of manufacturing and using such epoxy adhesives. Preferably, the epoxy adhesive comprises a curing agent, e.g., a light or temperature activated curing agent, e.g., a dicyandiamide.

Preferably, the epoxy adhesive comprises between about 10 wt % and about 50 wt % of the low bisphenol A toughener, more preferably between about 20 wt % and about 30 wt %, based on total weight of the epoxy adhesive.

Preferably, the epoxy adhesive further comprises at least one of an accelerator, a mineral filler, a thixotropic agent, a viscosity regulator, silica, a diluent, an adhesion promoter, a surfactant, a wetting agent, a flexibilized epoxy agent, a gelling compound, a flame retardant, a pigment, and combinations of two or more thereof. Manufacturing the epoxy adhesive preferably includes combining a low bisphenol A toughener with at least one of an accelerator, a mineral filler, a thixotropic agent, a viscosity regulator, a silica, a diluent, an adhesion promoter, a surfactant, a wetting agent, a flexibilized epoxy agent, a gelling compound, a flame retardant, a pigment, and combinations of two or more thereof.

Preferably, the epoxy adhesive of increases in viscosity less than about 10%, more preferably less than about 8% after one week of aging at 40° C. Preferably, the epoxy adhesive of increases in viscosity less than about 25%, more preferably less than about 15% after two weeks of aging at 40° C. Preferably, the epoxy adhesive of increases in viscosity less than about 50%, more preferably less than about 30% after three weeks of aging at 40° C.

Preferably, the epoxy adhesive, after one week aging at 40° C., increases in viscosity by an amount about 70% or less than the increase in viscosity after one week of aging at 40° C. of a comparative epoxy adhesive prepared with 21% bisphenol A. Preferably, the epoxy adhesive, after two weeks aging at 40° C., increases in viscosity by an amount about 70% or less than the increase in viscosity after two weeks of aging at 40° C. of a comparative epoxy adhesive prepared with 21% bisphenol A. Preferably, the epoxy adhesive, after three weeks aging at 40° C., increases in viscosity by an amount about 70% or less than the increase in viscosity after three weeks of aging at 40° C. of a comparative epoxy adhesive prepared with 21% bisphenol A.

The invention includes articles of manufacture comprising an epoxy adhesive comprising a low bisphenol A toughener, as well as methods of manufacturing such articles of manufacture.

Preferably an article of manufacture comprises a first surface and a second surface, wherein the epoxy adhesive is in contact with the first and second surfaces.

Preferably, methods of manufacturing an article, the article comprising a first and a second surface, comprise contacting the epoxy adhesive to the first surface to obtain a coated surface, and contacting the second surface to the coated surface. Preferably, the method further comprises exposing the epoxy adhesive to conditions under which the epoxy adhesive will at least partially cure, or will completely cure. Preferably, the exposing includes exposing to heat.

DETAILED DESCRIPTION OF THE INVENTION

The invention provides a low polyphenols (for example, bisphenol A) epoxy toughener composition comprising less than about 21 wt % bisphenol A, preferably less than about 20 wt %, more preferably less than about 19 wt %, even more preferably less than about 18 wt %, and most preferably less than 15 wt %, based on weight of the toughener composition. Amounts of bisphenol A are preferably greater than about 10 wt %, more preferably greater than about 12 wt %, even more preferably greater than about 14 wt %, based on weight of the toughener composition. Some preferred amounts of bisphenol A in the toughener include about 15 wt % and about 18 wt %, based on weight of the toughener composition. Reduction in viscosity is not generally a problem for epoxy tougheners, though a lower limit of 0% for increase in viscosity is reasonable.

The present invention also provides a method of manufacturing a toughener, comprising combining polytetrahydrofuran, bisphenol A (in an amount as noted above), and trimethylolpropane. The mixture is preferably heated to assist dissolution of bisphenol A. The mixture is then preferably cooled below 60° C. (if necessary), and a curing agent (e.g., a diisocyanate such as hexamethylene diisocyanate) is added and preferably mixed to homogeneity. It will be understood that the cooling step is preferable to prevent premature curing of the composition when the curing agent is added, and cooling to any temperature to avoid premature curing, or avoid excessive premature curing, is preferred. An organometallic catalyst, e.g., dibutyltin-dilaurate or bismuth octanoate, is then added, which preferably initiates polymerization, which may be an exothermic reaction. The resulting toughener is then preferably cooled and stirred to complete the reaction.

The epoxy tougheners of the present invention may be used in an epoxy adhesive composition to form an epoxy adhesive according to the present invention. Thus, the present invention provides epoxy adhesives with improved viscosity stability, methods of improving viscosity stability of epoxy adhesives, and methods of manufacturing epoxy adhesives with improved viscosity stability.

Any amount of toughener appropriate for the epoxy adhesive may be used, e.g., to provide suitable viscosity stability, and can be determined by one of skill in the art for a particular application. By way of guidance epoxy adhesives may contain less than about 50 wt % toughener, preferably less than about 40 wt % toughener, more preferably less than about 30 wt % toughener, based on weight of the epoxy adhesive. Epoxy adhesives may contain more than about 10 wt % toughener, preferably more than about 15 wt % toughener, even more preferably more than about 20 wt % toughener, based on weight of the epoxy adhesive. Some preferred amounts of toughener include about 22 wt %, about 25 wt %, and about 27 wt %, based on weight of the epoxy adhesive.

At one week after manufacturing epoxy adhesive comprising low bisphenol A toughener, the viscosity of the epoxy adhesive preferably increases by less than about 10%, preferably less than about 8%, more preferably less than about 5%, compared to viscosity at the time of manufacture. At two weeks after manufacture, the viscosity of the epoxy adhesive preferably increases less than about 25%, more preferably less than about 20%, even more preferably less than about 15%, yet more preferably less than about 10%, compared to viscosity at the time of manufacture. At three weeks after manufacture, the viscosity of the epoxy adhesive preferably increases less than about 50%, more preferably less than about 40%, even more preferably less than about 30%, yet more preferably less than about 20%, compared to viscosity at the time of manufacture. Reduction in viscosity is not generally a problem for epoxy adhesives, though a lower limit of 0% for increase in viscosity is reasonable.

The present invention also provides epoxy adhesives with low polyphenols (for example bis-phenol A) content. A low bisphenol A epoxy adhesive of the present invention preferably has improved viscosity stability compared to an epoxy adhesive prepared in the substantially the same way but with higher bisphenol A content, e.g., compared to an adhesive comprising a toughener prepared with about 21 wt % bisphenol A. At 1, 2, and/or 3 weeks after manufacture, the percentage increase in viscosity of an adhesive according to the present invention is less than the percentage increase of such a comparative epoxy adhesive. Preferably, the percentage increase in viscosity of an epoxy adhesive according to the present invention, at 1, 2, and/or 3 weeks after manufacture, is less than about 70%, more preferably less than about 50%, even more preferably less than about 30%, of the percentage increase in viscosity of such a comparative epoxy adhesive.

The present invention also provides compositions, articles, and methods, in which the epoxy adhesive comprising a low bisphenol A toughener may also comprise at least one of an accelerator, a mineral filler, a thixotropic agent, a viscosity regulator, a silica, a diluent, an adhesion promoter, a surfactant, a wetting agent, a flexibilized epoxy agent, a gelling compound, a flame retardant, a pigment, and combinations of two or more thereof.

The present invention also provides a manufacturing method comprising applying an epoxy adhesive between two components and bonding the two components by partially or completely curing the epoxy adhesive, wherein the epoxy adhesive comprises a low bisphenol A toughener.

The present invention also provides a manufacturing method comprising applying an epoxy adhesive between two components; bonding the two components by partially curing the epoxy adhesive in a first curing stage to obtain a partially cured article; aging the partially cured article; and curing the partially cured aged article in a second curing stage, wherein the epoxy adhesive comprises a low bisphenol A toughener.

The present invention also provides a method of manufacturing an article, the article comprising a first and a second surface, comprising contacting the inventive epoxy adhesive to the first surface to obtain a coated surface, and contacting the second surface to the coated surface. The epoxy adhesive may be partially or completely cured, e.g., as described above.

EXAMPLES

The following examples are for illustrative purposes only and are not intended to limit the scope of the present invention. Unless otherwise stated, the units are percent by weight.

Viscosities can be measured using any industrially accepted viscosity measuring methods. In providing examples of this application, the following method was used for viscosity measurement:

A simple steady shear rate flow test was performed on a TA Instruments AR 550 Stress Controlled Rheometer to measure viscosity. A 25 mm parallel plate geometry was used with an initial gap setting of 475 μm. Excess adhesives was then removed and the gap was set to 450 μm to maintain a consistent sample volume. Sample testing temperature was maintained at 38° C. using the Peltier temperature control plate capable of 0.01° C. resolution. A Peak Hold Flow Test was run at a constant shear rate of 30 1/s for 4 minutes with sampling every 10 seconds. The viscosity was taken at 3 minutes where steady state was achieved. The unit of viscosity is Pa*s.

Compositions

Tougheners A and B and comparative toughener C are prepared according to the following process from the amounts of components (in grams) listed in Table 1. The noted amount of polytetrahydrofuran having a molecular weight (Mw) of approx. 2000 is preheated at about 90° C. The resulting liquid is then poured into a vessel and the noted amounts of bisphenol A and trimethylolpropane are added. The resulting suspension is heated up to about 140° C. and stirred until all bisphenol A is dissolved. After the mixture is cooled down to about 60° C., the noted amount of 1,6 hexamethylene diisocyanate is added. The mixture is stirred to homogeneity. Then the noted amount of dibutyltin-dilaurate is added. An exothermic reaction is starting, followed by an increase of temperature between about 20 and about 30° C. up to about 90° C. The solution is cooled and stirred for 1 hour to finish the reaction.

The amounts of bisphenol A and other components of the tougheners, and the toughener viscosities, are listed in Table 1.

TABLE 1

|  | wt % in Toughener A | wt % in Toughener B | wt % in Toughener C |
|---|---|---|---|
| polytetrahydrofuran | 68.95 | 71.65 | 66.63 |
| bisphenol A | 17.97 | 14.76 | 20.71 |
| trimethylolpropane | 0.35 | 0.36 | 0.34 |
| hexamethylene diisocyanate | 12.71 | 13.21 | 12.30 |
| dibutyltin-dilaurate | 0.02 | 0.02 | 0.02 |

Epoxy resins comprising tougheners A, B and C are prepared as follows. The epoxy resins comprising tougheners A, B and C are referred to herein, respectively, as resin A, resin B, and resin C, or, alternatively, as epoxy adhesive A, B, or C.

In a typical epoxy resins, other chemical agents may also be used in addition to resins, rubbers (such as epoxy resin modified carboxyl terminated butadiene/acrylonitrile copolymer, referred to below in Table 2 as Intermediate). Such other chemicals may include different color pigments, adhesion promoter such as Silquest Silane A-187 available from Momentive Performance Materials Inc., curing agent such as dicyanide available from Air Products and Chemicals, Inc., tertiary amine accelerators, drying agent such as CaO, fillers, flame retardant, and thixotropic or rheology control agents, silica, a diluent, a surfactant, a wetting agent, a flexibilized epoxy agent, a gelling compound, and combinations of two or more thereof.

The resins (epoxy monomers such DER 331, DER 732 available from The Dow Chemical Company) and rubbers are first added to a typical mixing cup equipped with a mixer. Other chemical components, with the exception of dicyanide and tertiary amines, are then added for form a mixture. The mixture is further mixed with the mixer for about 1 minute at about 2,000 rpm. The mixture is then scraped down and cooled below 40° C. The dicyanide and tertiary amines are then added to the mixture. The mixture is then mixed under vacuum for 30 minutes at about 40° C. to form Resins A, B and C respectively.

TABLE 2

|  | Resin A | | Resin B | | Resin C | |
|---|---|---|---|---|---|---|
|  | grams | % | grams | % | grams | % |
| DER 331 | 43.81 | 43.80 | 43.81 | 43.80 | 43.81 | 43.80 |
| Intermediate | 10.00 | 10.00 | 10.00 | 10.00 | 10.00 | 10.00 |
| Toughener A | 25.00 | 25.00 | — | — | — | — |
| Toughener B | — | — | 25.00 | 25.00 | — | — |
| Toughener C | — | — | — | — | 25.00 | 25.00 |
| DER 732 | 2.40 | 2.40 | 2.40 | 2.40 | 2.40 | 2.40 |

TABLE 2-continued

|  | Resin A | | Resin B | | Resin C | |
|---|---|---|---|---|---|---|
|  | grams | % | grams | % | grams | % |
| Color pigments | 0.29 | 0.29 | 0.29 | 0.29 | 0.29 | 0.29 |
| Adhesion promoter. | 0.20 | 0.20 | 0.20 | 0.20 | 0.20 | 0.20 |
| Curing agent such as dicyanide | 4.00 | 4.00 | 4.00 | 4.00 | 4.00 | 4.00 |
| Tertiary amine accelerators | 1.00 | 1.00 | 1.00 | 1.00 | 1.00 | 1.00 |
| Drying agent | 4.00 | 4.00 | 4.00 | 4.00 | 4.00 | 4.00 |
| Fillers | 1.30 | 1.30 | 1.30 | 1.30 | 1.30 | 1.30 |
| Flame retardant such as Aluminum Trihydroxide | 2.30 | 2.30 | 2.30 | 2.30 | 2.30 | 2.30 |
| Thixotrope or rheology control agent | 5.70 | 5.70 | 5.70 | 5.70 | 5.70 | 5.70 |
| total | 100.0 | 100.0 | 100.0 | 100.0 | 100.0 | 100.0 |

The viscosities of epoxy resins A, B, and C (comprising tougheners A, B and C) are measured. Samples are then stored under controlled conditions at 40° C. and the viscosities measured periodically. The resin viscosities and the percentage changes from initial viscosities are shown in Table 3.

TABLE 3

|  |  | Viscosity (Pa * s) | | | |
|---|---|---|---|---|---|
|  |  | initial | 1 week at 40° C. | 2 weeks at 40° C. | 3 weeks at 40° C. |
| Resin A | % change | 180 | 188.5 | 197.8 | 210.9 |
|  |  | — | 4.7% | 9.9% | 17.2% |
| Resin B | % change | 217 | 215.1 | 211.6 | 208.7 |
|  |  | — | 0.0% | 0.0% | 0.0% |
| Resin C | % change | 143.5 | 161.8 | 185.9 | 221.3 |
|  |  | — | 12.8% | 29.5% | 54.2% |

The viscosities of resins A and B (comprising tougheners A and B respectively), show significantly more viscosity stability than does resin C (comprising toughener C). While the initial viscosity of resin A is higher than that of resin C, the greater viscosity stability of toughener A leads to lower viscosity of resin A after just three weeks aging.

The viscosity of resin B shows only a slight decrease over three weeks. This is probably due to the fact that Toughener B contains even lower amount of bis-phenol A (less than 15 wt % based on the weight of the toughener).

The invention claimed is:

1. A manufacturing method comprising applying an epoxy adhesive between two components; bonding the two components by partially curing the epoxy adhesive in a first curing stage to obtain a partially cured article; aging the partially cured article; and curing the partially cured article in a second curing stage, wherein the epoxy adhesive comprises:
    a) 10 to 50 wt % of a toughener composition wherein the toughener is a reaction product produced by mixing polytetrahydrofuran, bisphenol A, trimethylolpropane, heating the resulting mixture to dissolve the bisphenol A, cooling the mixture and adding a diisocyanate and then adding an organometallic catalyst and polymerizing, wherein the amount of the bisphenol A is greater than 10% and less than 15 wt % based on the combined weight of the polytetrahydrofuran, bisphenol A, trimethylolpropane, diisocyanate and organometallic catalyst;
b) an epoxy resin;
c) a rubber comprising an epoxy resin modified carboxyl terminated butadiene/acrylonitrile copolymer;
d) a curing agent comprising a dicyandiamide; and
e) an accelerator comprising a tertiary amine.

2. The manufacturing method of claim 1 wherein the epoxy adhesive comprises 20-30 wt % of the toughener composition based on total weight of the epoxy adhesive.

3. The manufacturing method of claim 1, wherein the epoxy adhesive further comprises at least one of a filler, a thixotropic agent, a viscosity regulator, an adhesion promoter, a surfactant, a wetting agent, a flexibilized epoxy agent, a gelling compound, a flame retardant, a pigment.

* * * * *